Dec. 10, 1968 M. C. CLERC 3,416,082
RATIO COMPUTER
Filed July 17, 1964 8 Sheets-Sheet 1

INVENTOR
MILTON C. CLERC

BY Cushman, Darby & Cushman
ATTORNEYS

INVENTOR
MILTON C. CLERC

BY Cushman, Darby & Cushman
ATTORNEYS

INVENTOR
MILTON C. CLERC

BY Cushman, Darby & Cushman
ATTORNEYS

INVENTOR
MILTON C. CLERC
BY Cushman, Darby & Cushman
ATTORNEY

INVENTOR
MILTON C. CLERC

BY Cushman, Darby & Cushman
ATTORNEYS

Fig. 8A
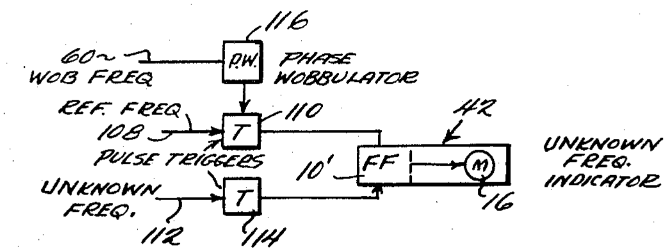
Fig. 8B
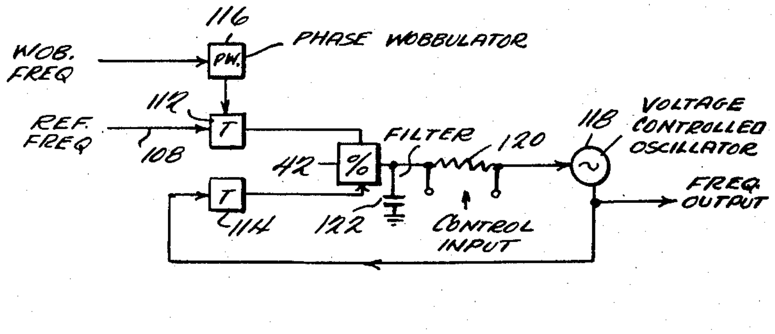
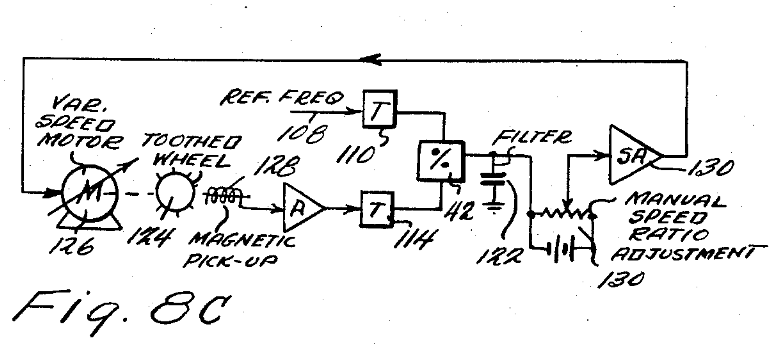
Fig. 8C
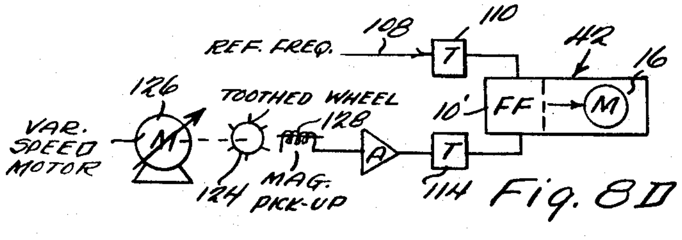
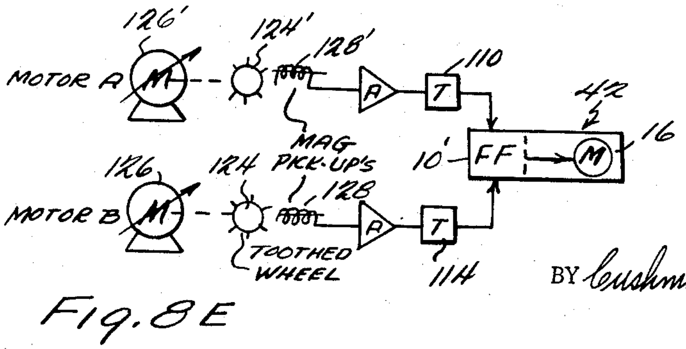
Fig. 8E
INVENTOR
Milton C. Clerc
BY Cushman, Darby & Cushman
ATTORNEYS INVENTOR
MILTON C. CLERC
BY Cushman, Darby & Cushman
ATTORNEYS Dec. 10, 1968 M. C. CLERC 3,416,082

RATIO COMPUTER

Filed July 17, 1964 8 Sheets-Sheet 8

INVENTOR
MILTON C. CLERC

BY Cushman, Darby & Cushman
ATTORNEYS

United States Patent Office 3,416,082
Patented Dec. 10, 1968

3,416,082
RATIO COMPUTER
Milton C. Clerc, Worthington, Ohio, assignor to The Industrial Nucleonics Corporation, a corporation of Ohio
Filed July 17, 1964, Ser. No. 383,307
3 Claims. (Cl. 324—79)

This invention relates to a ratio computer, and particularly to a computer for determining the pulse frequency ratio between two series or trains of pulses.

It is therefore the prime object of this invention to provide an improved and simple pulse rate or frequency ratio detector or computer.

Another object is the provision of such a detector that will compute the ratio of two random pulse frequencies, or a random and clock or reference frequency, or two clock frequencies, to a high degree of accuracy and at a low cost, using a flip-flop responsive to such frequencies for gating signals to an averaging or digital counting circuit providing the ratio.

This invention also relates to various embodiments of apparatus employing the pulse frequency ratio computer of this invention. While the detailed descripiton below is somewhat based on the use of nuclear sources and detectors for providing the trains of pulses, it will become fully apparent that the computer is useful in industrial and military equipment, other than that employing nuclear detectors, to obtain the ratio of pulse frequencies for providing various indications. For example, without limitation, the invention embodying the ratio computer is useful to indicate the ratio of speeds of two motors, or as a tachometer relative to one motor or other rotating device.

It is therefore an object of this invention to provide various types of equipment embodying the ratio computer of this invention for accomplishing various functions.

Other objects and advantages of this invention will become apparent upon reading the appended claims and the following detailed description of various embodiments of the invention, in conjunction with the drawings, in which:

FIGURE 1 is a diagrammatic and schematic representation of a pulse frequency ratio computer in accordance with this invention;

FIGURES 2A and B are theoretical current waveforms associated with the operation of the FIGURE 1 circuitry;

Figure 3A:
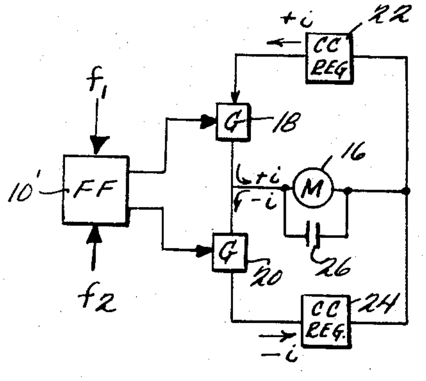
FIGURE 3A is a block diagram illustrating one embodiment of a ratio computer using a complementary gate circuit in accordance with this invention.
Figure 3B:
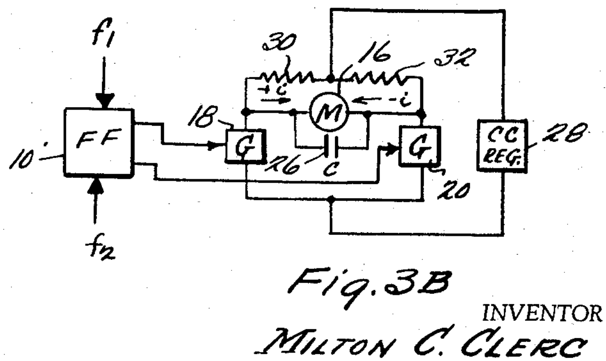
FIGURE 3B is a block diagram illustrating another embodiment of a ratio computer with a differential gate circuit in accordance with this invention.
Figure 3C:
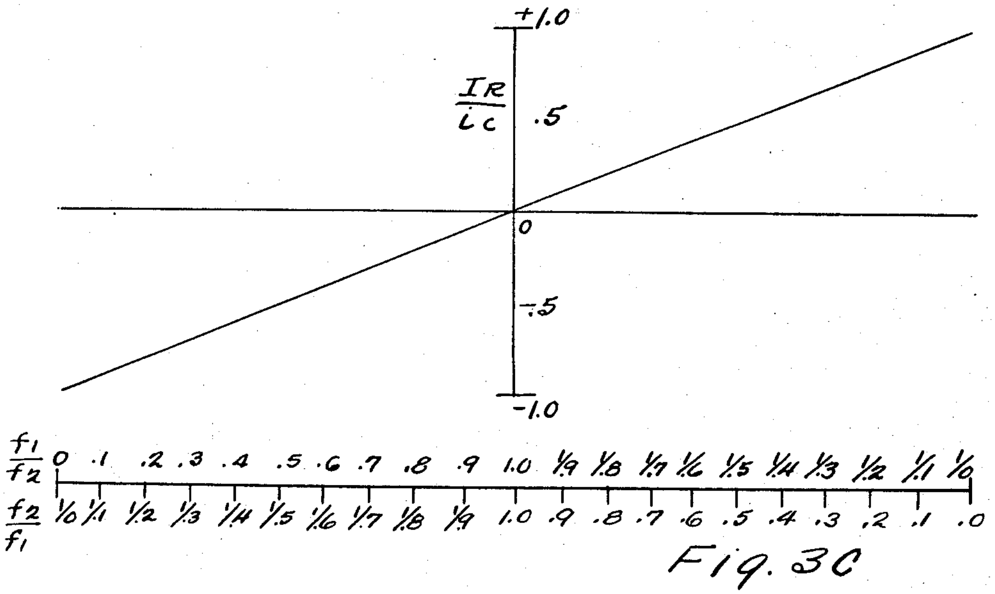
Figure 4A:
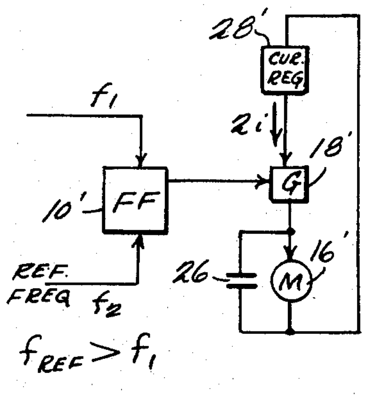
Figure 4B:
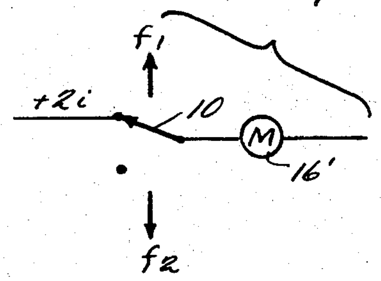
Figure 5A:
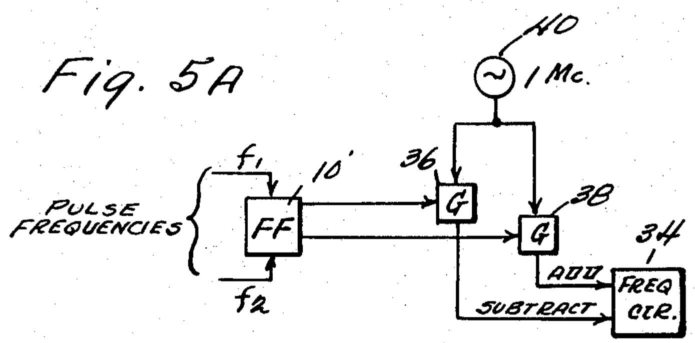
Figure 5B:
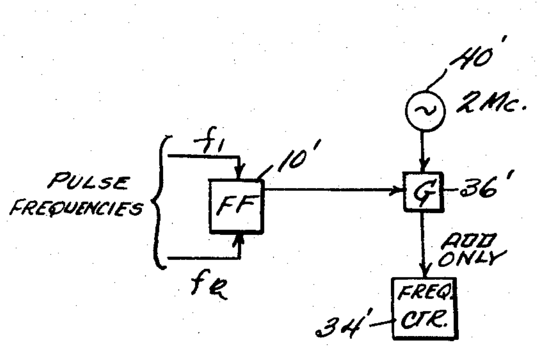
Figure 6A:
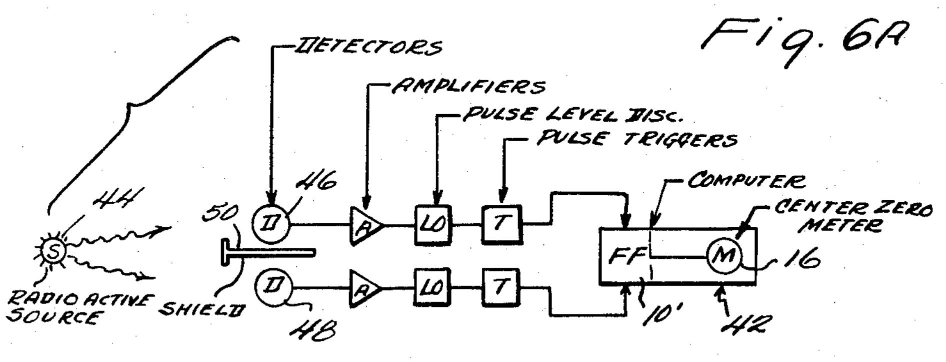
Figure 6B:
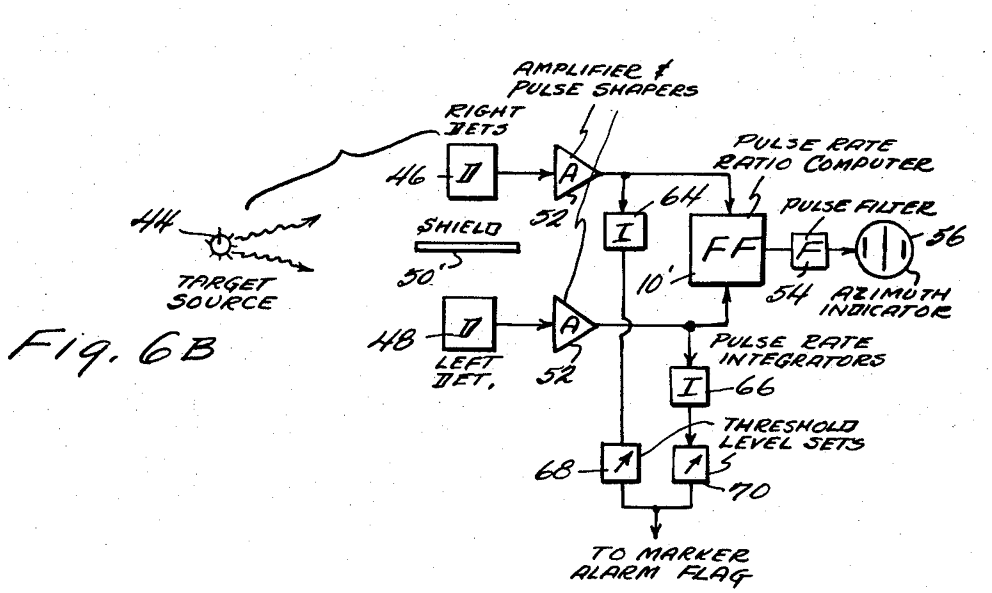
Figure 6C:
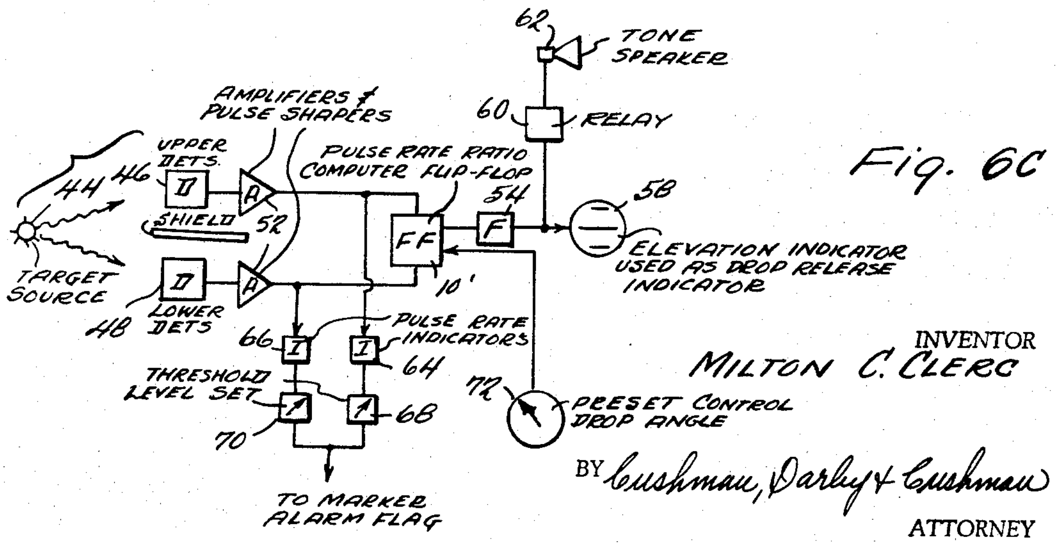
Figure 7A:
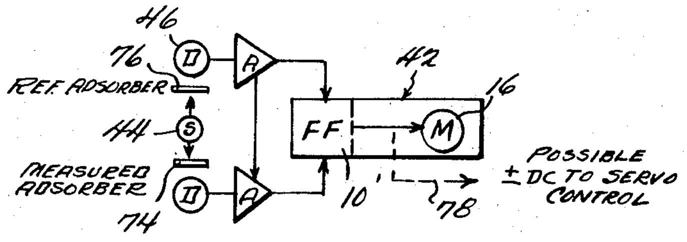
Figure 7B:
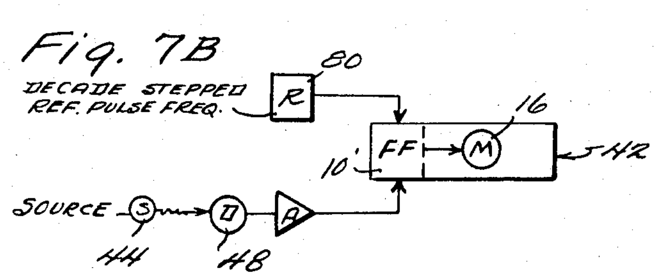
Figure 7C:
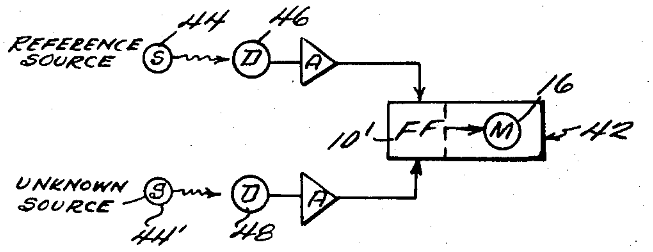
Figure 7D:
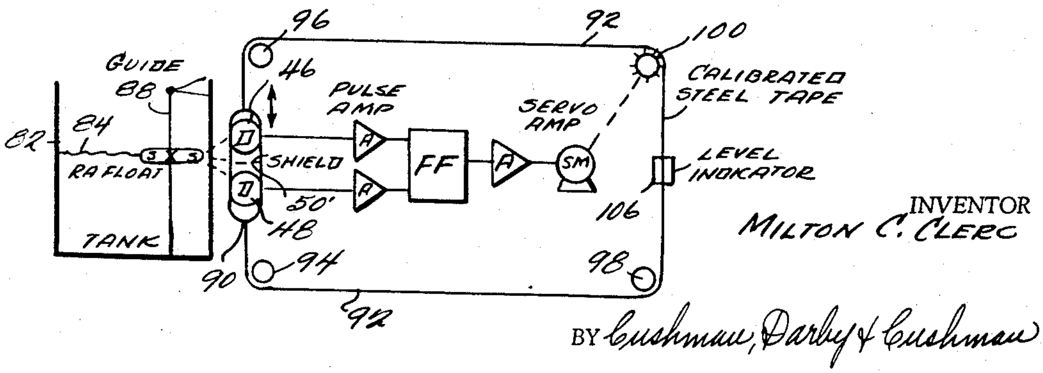
Figure 9A:
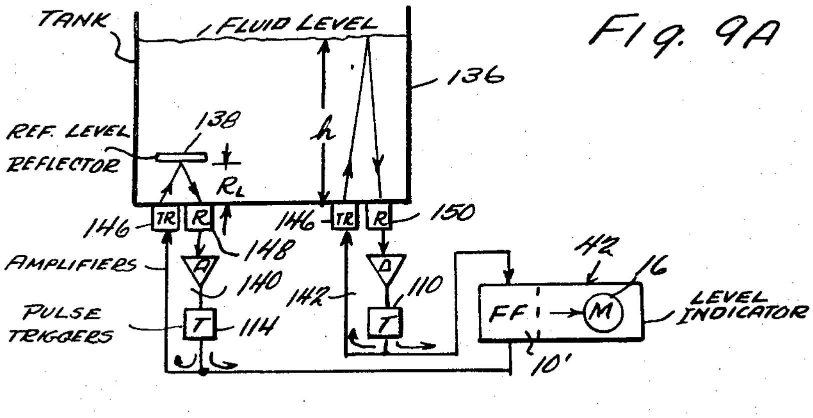
Figure 9B:
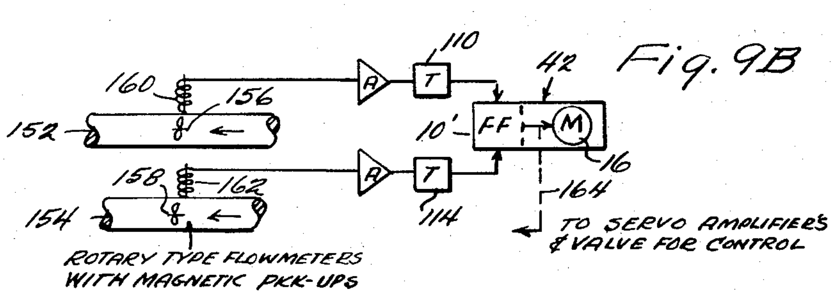
Figures 9C, 10:
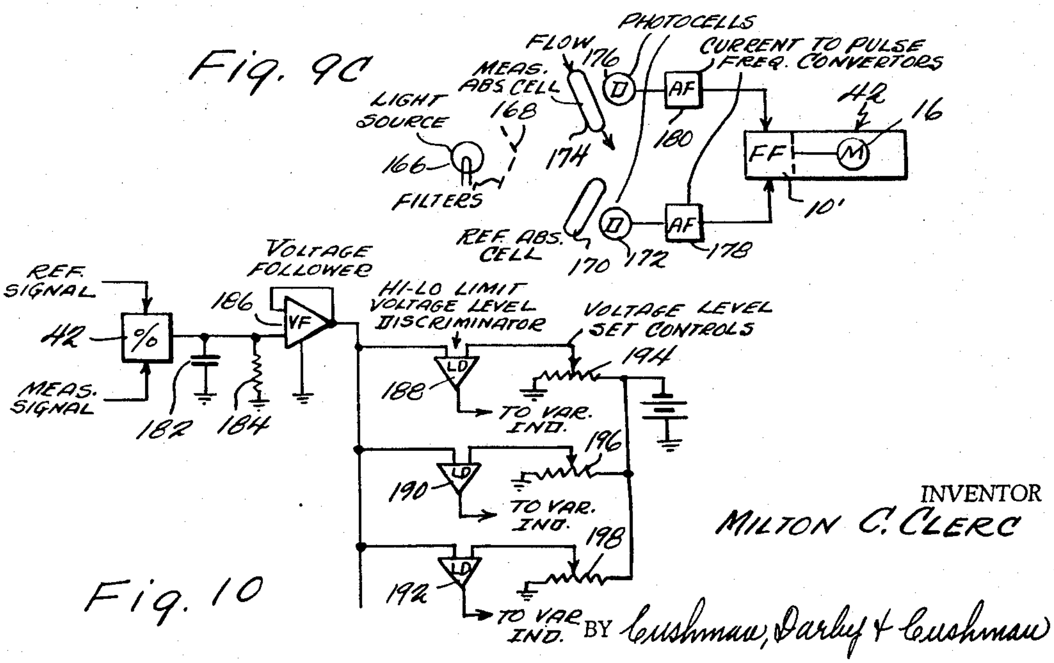
Figure 11:
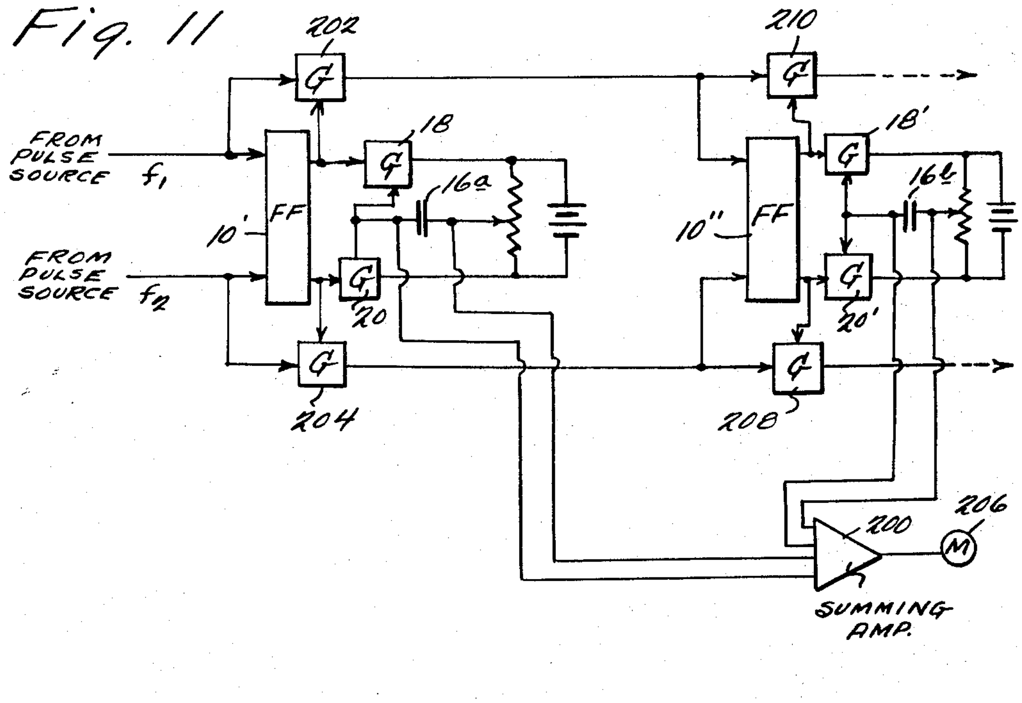

FIGURES 3C and D are computed calibration curves for a ratio computer constructed in accordance with this invention;

FIGURE 4A is a block diagram of a single-sided ratio meter in accordance with this invention;

FIGURE 4B is a schematic and diagrammatic representation of the circuitry of FIGURE 4A;

FIGURE 5A illustrates in block form circuitry for a digital bidirectional ratio computer;

FIGURE 5B illustrates in block form circuitry for a digital monodirectional computer;

FIGURE 6A illustrates in block diagram form circuitry for a radioactive source locator;

FIGURE 6B shows in block form circuitry for an azimuth indicator;

FIGURE 6C illustrates in block form circuitry of an elevation or drop release indicator;

FIGURE 7A illustrates in block form circuitry for a thickness or density meter;

FIGURE 7B illustrates a radioactive survey meter in block form;

FIGURE 7C illustrates in block form circuitry for a source calibration meter;

FIGURE 7D diagrammatically and schematically illustrates a servo tank level gauge;

FIGURE 8A illustrates a frequency meter or FM demodulator in block;

FIGURE 8B schematically illustrates in block form circuitry useable as an amplitude to frequency converter, a continuously variable source, or FM modulator;

FIGURE 8C shows schematically and diagrammatically circuitry for a precision continuously variable motor speed controller;

FIGURE 8D diagrammatically illustrates a precision tachometer;

FIGURE 8E diagrammatically illustrates a motor speed ratio indicator;

FIGURE 9A diagrammatically indicates a regenerative pulse type fluid level indicator;

FIGURE 9B diagrammatically illustrates a flow ratio meter;

FIGURE 9C diagrammatically illustrates a fluid photometric analyzer;

FIGURE 10 schematically illustrates a variance distribution indicator;

FIGURE 11 schematically illustrates a variance reducing system; and

Figure 12:
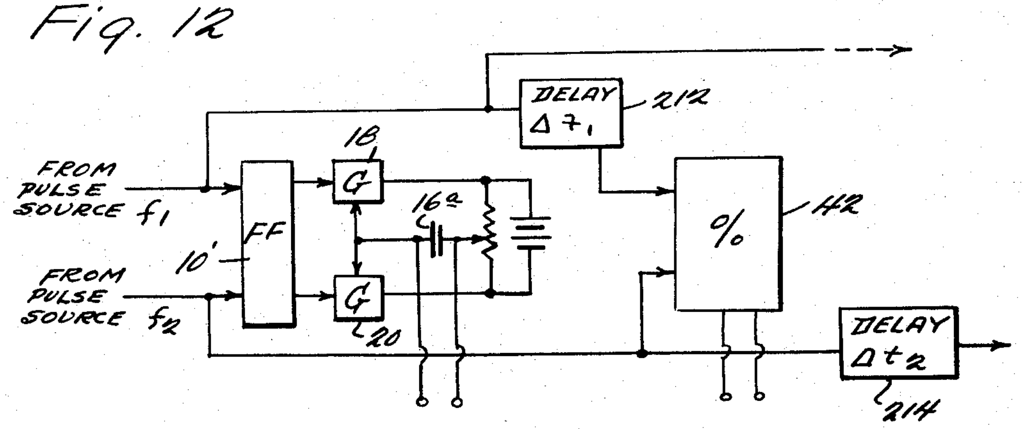

FIGURE 12 schematically illustrates another embodiment of a variance reducing system.

Figure 1:
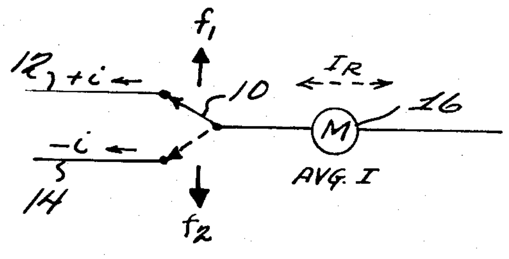

A diagrammatic representation of a frequency ratio computer according to the present invention as illustrated in FIGURE 1 includes a switch 10 movable between an upper position to connect with positive current on line 12 and a lower position to connect with negative current of equal amplitude on line 14. As illustrated by the arrows, a signal with frequency $f_1$ causes switch 10 to be moved to its upper position, while a signal with frequency $f_2$ moves the switch to its lower (dotted line) position. The output of switch 10 connects to any desired analog circuit or digital circuit to accomplish the desired ends. In FIGURE 1, meter 16 determines the average current $I_R$. Any integrating circuit can be used to obtain the average current. For example, the integrating meter 16 may be replaced by an integrating condenser. Then, a meter to determine the voltage integrated by the condenser would be connected across the condenser. In either case, the meter is of the zero center, plus-minus type, assuming positive and negative currents are to be averaged. In later single-sided versions, however, the meter can be of the zero left, plus type.

Though not shown in the diagrammatic representation of FIGURE 1, switch 10 could be operated by a relay, and such operation according to this invention would cause the switch to be thrown in one direction by a pulse of frequency $f_1$ and remain there until a pulse of frequency $f_2$ causes a switch to the opposite position, and vice versa. This means that the switch is bistable with two mutually exclusive positions or states. For example, switch 10 could be a differential latching relay of the electromagnetic type or as discussed below an electronic trigger circuit such as a bistable multivibrator or flip-flop.

It may be considered that signals $f_1$ and $f_2$ are trains of pulses with pulse frequencies that are either (1) random relative to each other so that the phase angle relationships of one with respect to the other could fall with equal probability at any point from 0 to $2\pi$ radians, or (2) two clock or reference pulse frequencies not harmonics of each other so that one advances on the other thus giving a uniform phase distribution, or (3) both signals $f_1$ and $f_2$ operating in opposite directions to position the double throw switch 10 either up or down and thereby switch equal positive or negative currents into an averaging and indicating circuit 16. The average current $I_R$ through meter 16 may be determined as follows.

In this determination of $I_R$, it is assumed that the switching time of switch 10 is negligible and that rectangular pulses without rounding or transients are produced. The average current $I_R$ is then the sum of a series of positive and negative rectangular current waveforms that vary linearly between two extreme shapes; one (FIGURE 2A) when the pulse of $f_2$ occurs an infinitesimally small time ($\Delta t$) after the nearest pulse of $f_1$; the other when $f_2$ occurs an equally small time before the nearest pulse of $f_1$ (FIGURE 2B). If the average current of these two extreme waveforms is taken, each over a period of $1/f_2$ of the lowest frequency $f_2$, it can be assumed that this is also the average of all the frequencies.

Figure 2A:
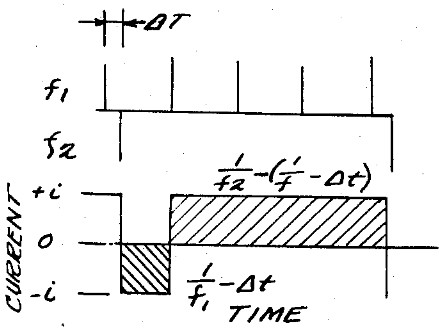
Figure 2B:
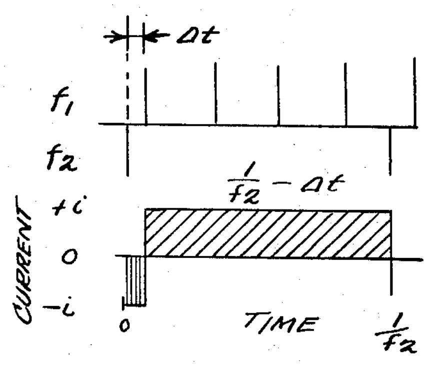

In FIGURE 2A the area A of the waveform from a time 0 to $1/f_2$ is integrated:

$$A_1=i\left[\frac{1}{f_2}-\left(\frac{1}{f_1}-\Delta t\right)-\left(\frac{1}{f_1}-\Delta t\right)\right]=i\left[\frac{1}{f_2}-\frac{2}{f_1}+2\Delta t\right]$$

and similarly for FIGURE 2B:

$$A_2=i\left(\frac{1}{f_2}-\Delta t-\Delta t\right)=i\left(\frac{1}{f_2}-2\Delta t\right)$$

Adding gives:

$$A_1+A_2=i\left[\frac{1}{f_2}-\frac{2}{f_1}+\frac{1}{f_2}\right]=i\left(\frac{2}{f_2}-\frac{2}{f_1}\right)$$

and dividing by $2(1/f_2)$, the integrating time, the average current $I_R$ is obtained:

$$I_R=i\left(\frac{\frac{2}{f_2}-\frac{2}{f_1}}{\frac{2}{f_2}}\right)=+i\left(1-\frac{f_2}{f_1}\right)$$

which holds only if $f_1$ is greater than $f_2$, that is $f_2/f_1$ is less than one.

If $f_1$ is less than $f_2$ then the relationship is:

$$I_R=-i\left(1-\frac{f_1}{f_2}\right)$$

In the first case, the resultant current $I_R$ averaged through the meter is positive; in the second case, negative.

Figure 3D:
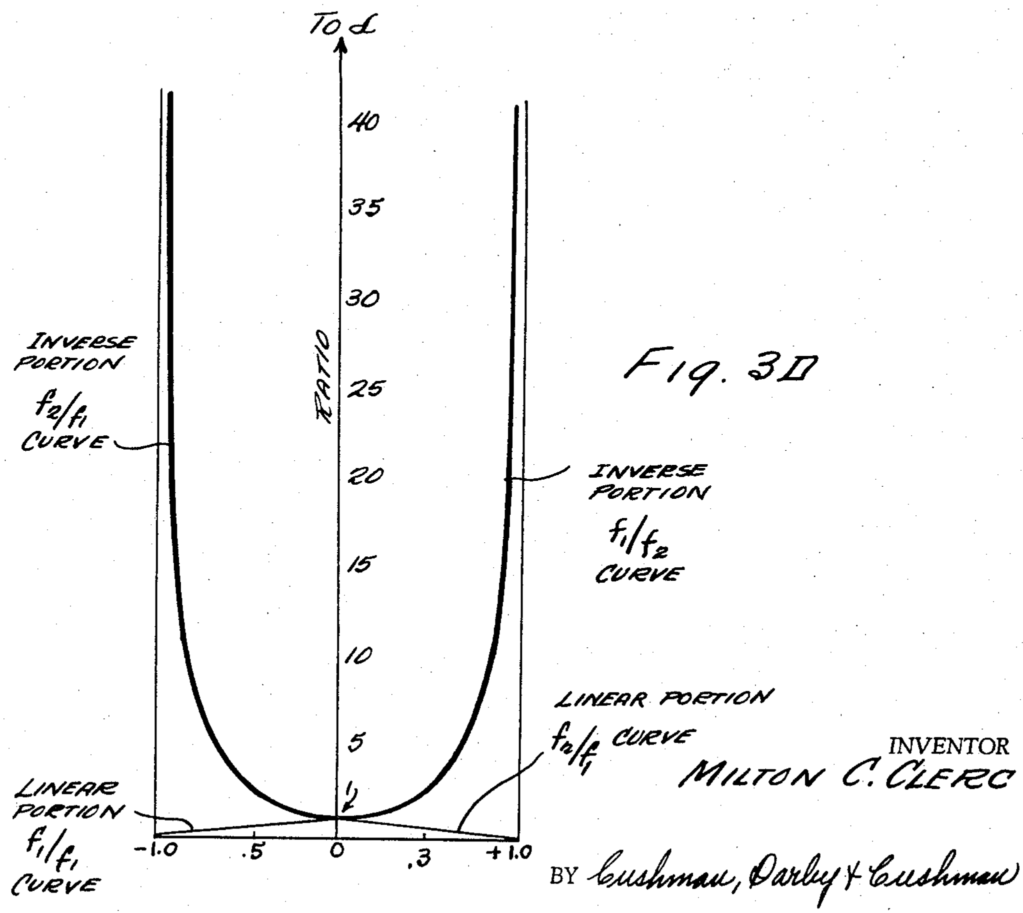

When $f_1$ and $f_2$ are equal, the resultant current is zero and the bidirectional meter M is at its midpoint. FIGURE 3C is a computed calibration curve. FIGURE 3D is the same with ratios on a linear scale.

When either $f_1$ or $f_2$ becomes zero, the resultant current $I_R$ is equal to $\pm$, $\pm i$, the direction indicating that of the frequency present. When both are absent, the needle can assume either extreme. This corresponds to the mathematical indeterminate 0/0.

FIGURES 3A and 3B indicate the type of circuitry that may be employed in electronic embodiments of this invention. The bistable switching device 10' in these embodiments is an electronic flip-flop of conventional form, having set and and reset inputs for respectively placing the switch in opposite ones of its two mutually exclusive states. Also in conventional manner, flip-flop 10' has two outputs one of which is high while the other is low when the flip-flop is in one state, and vice versa for the other state. In FIGURES 3A and 3B, the output signals from flip-flop 10' are respectively employed to operate gates 18 and 20. That is, these outputs when in a relatively high condition for example, enable the respective gate and disable same when in a relatively low condition. In FIGURE 3A, two constant current regulators 22 and 24 are provided for developing the equal amplitude positive and negative currents. These are connected in circuit with the integrating meter 16 in such a manner that the meter receives positive current through gate 18 when it is enabled, and negative current through gate 20 when it is enabled. A smoothing condenser 26 may be connected across meter 16 if necessary to effect further smoothing for the frequencies of operation in question, i.e., to average some of the statistical variance. It is apparent from FIGURE 3A that when a pulse of signal $f_1$ actuates flip-flop 10' to place it in one state, gate 18 opens and positive current flows through meter 16. On the other hand, when a pulse of signal $f_2$ actuates flip-flop 10' to change its state, gate 18 closes and gate 20 opens to pass negative current through meter 16. The resultant reading on the meter is an average of the positive and negative currents gated therethrough, and therefore an indication of the ratio of the pulse frequencies in signals or trains $f_1$ and $f_2$, since the resulting DC current is linearly proportional to the ratio of those frequencies, zero output of the meter being when that ratio is one.

In FIGURE 3A the gates are in a complementary circuit, but in FIGURE 3B they are in a differential circuit. In this latter circuit only a single constant current regulator source 28 is employed in conjunction with equal valued precision resistors 30 and 32 which are connected in parallel between the current source 28 and meter 16. If gate 18 is enabled, current from source 28 flows through resistor 32 and meter 16 back through gate 18 for a negative current flow through the meter. On the other hand, when gate 20 is open, current flows from source 28 through the resistor 30, and meter 16 in the opposite or positive direction, and back through gate 20. The average current resulting from the opening and closing of gates 18 and 20 by flip-flop 10' caused by two trains of pulses respectively applied to the inputs of the flip-flop, indicates the pulse frequency ratio of the pulse frequencies $f_1$ and $f_2$.

While flip-flops 10' may be of the vacuum tube type for some situations, others which require a faster response time because of the higher frequency of the pulse train inputs will employ transistorized flip-flops or the like. Gates 18 and 20 will be embodied in a corresponding manner.

Usually the peak current "$i$" is adjusted to be the full scale current of the meter. The meter will then read $f_1=100\%$ full scale positive to $f_2=100\%$ full scale negative with a center of zero current for 50% $f_1$ or 50% $f_2$. The response is linear with $f_1/f_2$ on one side of midscale and with $f_2/f_1$ on the other. The two linear portions of the curve coincide at midscale, as will be apparent by reflection on FIGURES 3C and 3D.

In those cases where a reference frequency is used and a ratio between 0 and 1.00 is required, the circuit illustrated in FIGURE 4A and diagrammatically represented in FIGURE 4B is suitable, remembering that the reference frequency $f_2$ must always be greater than the measured frequency $f_1$. This is a circuit with a single gate 18' operated from one side of the flip-flop. The maximum controlled current from regulator 28' is kept at $2i_c$ where $i_c$ is the full scale deflection of the meter. The meter then reads linearly from 0 to $i_c$ for a frequency ratio of 0 to 1.00.

If it is remembered that the ratio computer merely divides "on time" between two circuits in proportion to the frequency ratios it can be seen that the invention is not limited to switching controlled currents only. Regulated voltages or even constant frequency pulses may be switched using a digital frequency rate counter on the output and producing a digital output. For a bidirectional circuit, counter 34 in FIGURE 5A is of the "add-subtract" type; for a single-sided circuit an ordinary "add" counter 34' can be used as shown in FIGURE 5B. Two gates 36 and 38 gate the signal source 40 in accordance with the state of flip-flop 10'. The unidirectional computer in FIGURE 5B uses a precision clock frequency (2 Mc.) twice that of the bidirectional unit in order to give a ratio of one when the frequencies are equal. The unidirectional counter 34' reads the $f_2/f_1$ ratio direct from 0 to 1.00 only, while bidirectional counter 34 reads $$1-\frac{f_1}{f_2} \text{ or } -1+\frac{f_2}{f_1}$$

with the center zero.

With the foregoing information concerning the basic ratio computer of this invention in mind, it is apparent that since the plus or minus DC output of the computer is zero when the input frequencies are equal, numerous useful embodiments of the invention involving gageing, balancing or the use of servos can be made.

The fact that it takes the normal pulse output of a variety of nuclear detectors and, with a minimum of processing and at a relatively low cost, converts directly to a polarity reversing DC output which is desirable for indicating meters and recorders indicates that it finds application in both military and industrial devices.

Its use in control instruments is enhanced by the fact that there is little inherent delay in the computer such as is present in ionization chamber instruments. There is delay in the output filter used for statistical smoothing but this can be adjusted to suit the process requirements.

In FIGURE 6A the ratio computer 42, which is constructed in accordance with the present invention, for example as in FIGURES 3, 4 or 5 is employed in an arrangement for locating a radioactive source 44. Two detectors 46 and 48 are shielded as necessary, as by shield 50, and each detector provides a train of output pulses through an amplifier A to a pulse level discriminator LD which fires pulse triggers T. These triggers sharpen the pulses and apply them to opposite inputs of the flip-flop 10' of the ratio computer. Meter 16 indicates not only the frequency ratio of the two pulse trains developed by detectors 46 and 48, but also by that ratio indicates the relative direction of source 44 from those detectors. This general type of locator has particularly beneficial use in the medical fields where it may be employed as a research tool to pinpoint a location of a radioactive material in metabolic and other investigations. It might also be used to locate lost radioactive material used for treatment in hospitals or elsewhere employed.

The equipment in FIGURE 6A is also especially useful in the aeronautical and military fields, as shown in FIGURES 6B and 6C. The circuits of FIGURES 6B and 6C may be employed together with shield 50' shielding each detector from the other. In both cases the pulse trains developed by the detectors in response to radiation from source 44, are passed through the amplifier and pulse shapers 52 to a pulse rate ratio computer flip-flop 10', the pulse output of which is filtered by a pulse filter 54. In FIGURE 6B an ILS azimuth indicator 56 is connected to the output of the pulse filter 54, while in FIGURE 6C the filter feeds an ILS elevation indicator 58, which is also used as a drop release indicator. The filter may further feed a relay 60 and a tone speaker 62, as desired.

The main difference between FIGURES 6B and 6C is the addition in the latter of an angle bias voltage by presetting control 72 to allow for the difference between the actual drop angle desired and the average drop angle. This voltage as applied to flip-flop 10' will cause the horizontal needle on the ILS indicator 58 to cross the center when the desired drop angle is reached.

The count rate from the detectors from FIGURES 6B and 6C is used to generate both the azimuth and drop point signals or elevation as has already been indicated.

However, there may be some count rate due to natural background such as cosmic rays and the like. In order to be able to give a signal to the pilot when the count rate has risen above background, the threshold level set circuits 68 and 70 are fed from amplifiers 52 through pulse rate integrators 64 and 66, giving an output signal to the marker alarm flag, which will retract the "off" flag on the ILS indicator 56 or 58. The effect of background count including cosmic rays is to "stiffen" the ratio system, limit its sensitivity, and to provide an offset action. The output equation of the ratio computer expressed $$I_R=i_c\left(1-\frac{f_1}{f_2}\right)$$

can be rewritten in the presence of background to $$I'_R=i_c\left(1-\frac{f_1+b_1}{f_2+b_2}\right)$$

in which $b_1$ and $b_2$ are the background counts at the two detectors, respectively. If $b_1$ and $b_2$ are equal and become high relative to the signal counts, the ratio approaches one as a limit in the sensitivity or ability to detect differences in $f_1$ and $f_2$ decreases. If $b_1$ and $b_2$ are not equal, they produce an offset which approaches their ratio as their count rate goes up. If this ratio is constant it can be balanced out; if not, means must be taken to reduce them by shielding or level discrimination.

Still a further embodiment of the invention is illustrated in FIGURE 7A, which relates to a meter or gauge for determining the thickness or density of a material 74 against the thickness or density of a reference absorbing material 76. In this case, meter 16 can be marked to indicate the relative thickness or density of the two materials, which is a direct function of the pulse frequency of the trains of pulses from detectors 46 and 48. Besides being a meter, the circuitry in FIGURE 7A can also be connected to apply the ±DC signal on line 78 to a servo control unit for controlling equipment which regulates the thickness or density of the material 74 being measured.

The circuit in FIGURE 7A can be used to measure or control the density ratio between a reference material and a solid liquid or gas. If a liquid were the tested material, it could be used to measure and control its own level; and if a gas were the tested material 74, it could be used to measure and control the pressure as a function of its density.

FIGURE 7B illustrates a precision radioactivity survey meter which depends on a calibrated pulse frequency as its standard reference source 80. The count accuracy will approach that of the standard. Reference source 80 may be a crystal control oscillator, with ranges being achieved by decading the reference pulse frequency down, say, from 100 kc. to 10 kc., 1 kc., 100 c.p.s., and 10 c.p.s. No other switching would be necessary as the ratio computer 42 calculates a true ratio. More averaging time may be required for the lowest frequencies.

In FIGURE 7C, a circuit is shown for purposes of calibrating an unknown source 44' against a known radioactive reference source 44. This source calibration meter or gauge will provide a source activity ratio indication on meter 16.

The diagram in FIGURE 7D relates to a servo tank level gauge. The tank or container diagrammatically indicated by numeral 82 contains fluid 84 on which is a radioactive float 86. This float is guided in its vertical movements by a line 88 which maintains the float, as it moves up and down with the level of fluid 84, equidistant from the container wall. Disposed outside the container are two detectors 46 and 48 shieldingly spaced and mounted on a holder 90 which is vertically movable by virtue of its connection at opposite ends to an endless steel tape 92, which is guided over vertically disposed corner rollers 94 and 96. At its opposite end, guide rollers 98 and 100 are employed to maintain the tape taut, and roller 100 drives the tape in accordance with direction signals from servo motor 102. As the pulse trains from detectors 46 and 48, resulting from respective detection of the radioactive source in float 86, are compared in the frequency ratio computer 42 to provide an average DC signal to servo amplifier 104, servo motor 102 is accordingly rotated in the direction which will cause detectors 46 and 48 to be moved so that they obtain an equal amount of radiation from the source in float 86. Tape 92 is calibrated and consequently the level of fluid 84 in the tank may be noted on the level indicator 106 adjacent the right end of the tape loop. This device has the advantage that, with the exception of the float and guide, all its working parts are completely removed from the inside tank conditions, and in fact, could be sealed off from the outside atmosphere to any degree required, thereby eliminating the effect of corrosive atmosphere, dirt, and fluid temperature.

FIGURE 8A illustrates the use of the ratio computer 42 as a precision frequency meter or FM demodulator. A decade reference frequency applied to line 108, which can have its source in a precision crystal oscillator, is converted to sharp pulses of the same or lower decade frequencies by pulse trigger 110. The unknown frequency on line 112 is also converted to pulses, by pulse trigger 114, and the output of both triggers is compared frequency-wise in the ratio computer 42. Meter 16 is calibrated to show the value of the unknown frequency. As harmonics of the reference frequency are approached, a slow beat action occurs, which gives a vernier effect and calibration check. Thus, the same instrument provides a wide range and vernier indicator. Where a continuous unmodulated output is required, a "wobbulation" or frequency modulation of the reference pulse can be performed to ensure a smooth output, by using a phase wobbulator 116 with a 60 cycle wobbulating frequency input, for example. This shifts the reference frequency about a center point to chop up the slow hetrodyne signal that is hard to filter. By periodically shifting or wobbling the phase or frequency of the reference signal, or the unknown signal if desired, the meter indicates which source is larger.

An FM demodulator can be constructed on the same principle but higher frequency components would have to be used to operate at the normal IF frequencies employed. It would be a true ratio detection and would give a precise output for a given frequency deviation. This should make it useful for telemetry measurements where such a feature is highly desired. The circuit of FIGURE 8B corresponds to such a demodulator; it employs somewhat the same components but, in addition, has a voltage controlled oscillator 118 and is useful as an amplitude to frequency converter, continuously variable frequency source, or FM modulator. The ± DC output of the ratio computer 42 controls the frequency of oscillator 118. This is fed back to trigger 114 and is therein converted to pulses and then fed to the ratio computer. The DC output of the computer is of such polarity and voltage as to drive the oscillator to the reference frequency and, thence, the computer output towards zero. A variable DC bias introduced as a control input across resistor 120 after filter condenser 122 between the computer and the oscillator will then produce a frequency change linear with the bias amplitude and the output will be a frequency whose ratio to the reference frequency is linearly proportional to the bias.

An audio signal applied to resistor 120 in FIGURE 8B in place of the bias will modulate the output signal to transmit voice or music or other information.

When a precision reference and an accurate driftless bias voltage are used in FIGURE 8B, this device can be employed as a precise, continuously variable frequency source, widely useful in the electronic industry for both audio and radio frequency oscillators.

In FIGURE 8C, a precision continuously variable motor speed controller is illustrated. A toothed magnetic wheel 124 is turned by the shaft of a variable speed motor 126 which is to be controlled. A magnetic pickup coil 128 generates a frequency proportional to the shaft speed and the number of teeth on wheel 124. This frequency is applied to the ratio computer 42 through an amplifier and a pulse sharpener or trigger 114, along with trigger pulses from a precision reference source. The resultant frequency ratio is fed as a DC signal across a filter condenser 122 through a manual bias control 130 to a servo amplifier 132, the output of which is fed back to control the speed of motor 126. Bias control 130 serves to set the motor speed at any required ratio relative to the reference frequency on line 108. Since the reference frequency can be made quite precise, the motor speed can be varied continuously to an accuracy approaching that of the standard.

From the description of the motor speed controller of FIGURE 8C, it is apparent how the precision tachometer of FIGURE 8D operates to provide on meter 16 an indication of the speed of motor 126.

In FIGURE 8E, meter 16 indicates the ratio of the speeds of motors 126 and 126' in a manner quite apparent from the last two figures.

FIGURE 9A is an illustration of a fluid level indicator employing regenerative pulses. Fluid 134 in container 136 varies in height *h*. A pulse reflector 138 is positioned above the bottom of the container at a desired reference level $R_L$, for example one foot. Two regenerative pulse oscillators 140 and 142 are employed to transmit pulses respectively to reflector 138 and the top level of the fluid. Each oscillator has a transmitter 144 and 146, and a respective receiver 148 and 150 to receive back the reflected pulses. These pulses are applied to pulse sharpening circuits 110 and 114 the output of which is employed not only to trigger another pulse from transmitters 144 and 146, but also to trigger ratio computer 42, whereby meter 16 indicates the fluid level *h* relative to the reference level $R_L$. Correction for temperature variations of sound velocity or density of the liquid is automatic.

In FIGURE 9B, a flow ratio meter or controller is illustrated. Each of pipes 152 and 154 have a rotary type flowmeter diagrammatically shown as elements 156 and 158, with external magnetic pickups 160 and 162 providing signals to pulse triggers 110 and 114 in proportion to the flow of fluid through the respective pipes. The pulses from triggers 110 and 114 are then fed into the ratio computer 42, and meter 16 indicates an output proportional to the ratio of the flows. Automatic servo control may be employed by using the average DC signal on line 164.

The ratio computer 42 in FIGURE 9C is employed in a gas or liquid photometric analyzer, in which is employed a suitable light source 166 of the ultraviolet, visible or infrared type. This light is passed through a filter 168 and a fluid reference absorbing cell 170 to a photodetector 172. On the other side the light from the filter passes through a measuring absorbing cell 174 to a photodetector 176. The outputs of the photodetectors, which may be photocells, are converted to pulse frequencies by converters 178 and 180, and the resulting pulse trains are fed to opposite sides of the ratio computer 42. Meter 16 gives an indication of the analysis of the gas or liquid flowing through cell 174 relative to that in the reference cell 170.

In the variance distribution indicator of FIGURE 10, use is made to the fact that an off balance signal from the ratio computer 42 is indicative of a given departure of the signal being measured from a norm such as the reference signal applied to the ratio computer, assuming the measuring system is set up to give a zero norm. Following the smoothing condenser 182 and the biasing resistor 184 is a voltage follower 186, which applies its output in parallel to a plurality of voltage level discriminators 188, 190, 192, more or less of which may be employed as desired. These discriminators may have their level of discrimination determined by the respective variance level set controls or potentiometers 194, 196, 198, so that the voltage discriminators are set to trigger at given percents off norm. The outputs of the discriminators may be applied through logic circuits (not shown) to give a count in the proper group.

FIGURES 11 and 12 illustrate variance reducing systems. Due to an assumed random nature of pulses in the trains $f_1$ and $f_2$, it is possible that the flip side of flip-flop 10′ may receive one or more extra pulses before a pulse occurs in the $f_2$ train, or vice versa. This may result in lost pulses, that is, pulses that are present but do not furnish useful information to the system. Both of the circuits of FIGURES 11 and 12 may be used to reduce the variance due to lost pulses. In FIGURE 11, flip-flop 10′ is associated with its respective outputs gates 18 and 20 in a manner similar to the arrangement of FIGURE 3B, with the averaging or integrating of the DC signal taking place across condenser **16*a* and that signal is applied to summing amplifier 200. The output from across condenser 16*a* will in general have a variance that is greater by a factor of two than a system giving a theoretical minimum. To reduce the variance toward that minimum by taking care of some of the "lost" pulses which flip-flop 10′ cannot handle, additional gates 202 and 204 are respectively connected to be enabled by opposite outputs of flip-flop 10′, to pass the lost pulses over to a second ratio computer including flip-flop 10″ which has gates 18′ and 20′ connected to it in the manner of FIGURE 3B. Across the output integrating element 16*b* a signal is developed which is also applied to summing amplifier 200, thereby giving an indication on meter 206 a more complete average of the pulse frequencies in trains $f_1$ and $f_2$. This process may be carried to any further number of steps desired, for example as by adding gates 208 and 210 to take care of the pulses lost or not handled by flip-flop 10″**. In this manner, the measured portion of the lost pulses can be regained to control the output of a circuit.

In FIGURE 12, the procedure for reducing the variance is based upon comparing a series of random pulses by placing a time delay in the path of one set of pulses in order to eliminate the lost pulses. The two sets of random pulses $f_1$ and $f_2$ are fed to flip-flop 10′ which enable gates 18 and 20 in the manner previously described. The output across condenser **16*a* will, as before, have in general a variance that is greater by a factor of two than by a system giving the theoretical minimum. The same pulses $f_1$ and $f_2$ are simultaneously applied to another ratio computer 42 through a time delay element 212. Due to the time delay, the pulses that had a certain phase relationship in both sets will have this relationship changed. The actual ratio will not change but the random change of states of the flip-flops and times between those changes will change. This gives a certain probability that some of the pulses lost when no time delay is introduced will be regained as useful control information when the time delay 212 is added as in FIGURE 12. If this is done enough times with enough different time delays, a high percentage of lost pulses is regained. That is, following ratio computer 42, a second time delay 214 may be introduced ahead of a third ratio computer (not shown). The outputs of the various ratio computers may be summed as in FIGURE 11, and the sum should have a reduction in variance closer to the no-lost-pulse theoretical minimum. While the time delays are shown in FIGURE 12 as being placed alternatively in the random pulse lines, they may be placed in the same line throughout or in both lines ahead of each ratio computer, as desired. The delay times of the various delay units 212 and 214** are related to the particular set of random pulses employed.

From the foregoing numerous illustrations of novel applications for the frequency ratio computer of this invention, it is apparent that the computer proves useful in numerous instances, with the following reasons therefor being exemplary. The inherent accuracy of the computer is dependent only upon the efficiency of its switching action and the accuracy of its current regulation both of which are readily obtainable with semiconductors. It is capable of very high speeds with the proper semiconductors reaching to possibly 50 million pulses per second. The computer is simple, low cost, and has a high degree of reliability because of the small number of parts required. It has a direct action in converting from pulse rates, which are a normal output of nucleonic detectors to a linear polarity reversing DC current, which is a most desirable input for indicating and recording instruments and servo controls. The time gating feature of the computer permits the gating of reference frequency pulses or other signals into counters giving a digital output as well as effecting a direct current giving an analog output. Though not shown above, obviously both types of output can be obtained from the same instrument with a parallel connected pair of gates, for example the digital circuit of FIGURE 5A may be combined with the analog circuit of either FIGURES 3A or 3B, using a single flip-flop 10′ to feed the two different pairs of gates.

The computer of this invention also has a fast time response which permits the averaging time to be set by the variance and requirements of the measurement or control system. The fact that the computer is a true ratio device means it can work on both low and high pulse rates giving the same output, the only limitation being the background count and the averaging required by the variance at the radiation level used. This permits the use of comparatively weak and relatively safe radioactive sources.

It is especially noteworthy that the nuclear pulse detectors employed with the computer may be of either the Geiger tube type, scintillation counters or solid state pulse detectors. There is a wide adaptability of this invention to various types of measurement and control systems as evidenced by the applications above described, and it is possible to expand the invention into more complex computing systems.

It is therefore apparent that this invention has provided for all of the objects and advantages herein mentioned. Still further objects and advantages, and even other modifications and embodiments of the invention, will become apparent to those of ordinary skill in the art upon reading this disclosure. However, it is to be understood that the present disclosure is exemplary and not limitative, the invention being defined by the appended claims.

What is claimed is:

1. A ratio computer for determining the pulse frequency ratio of first and second trains of pulses, comprising:
   electronic switch means having two mutually exclusive stable states, two outputs for respectively signalling the condition of said states and two inputs for respectively receiving said pulse trains to effect said states by pulses respectively from said two trains,
   constant amplitude source means for effecting a first source signal of one polarity at one end of the source means and a second source signal of opposite polarity at its opposite end,
   said source means having a central common reference point for said first and second source signals,
   first gate means having an output and having two inputs respectively coupled to said one end of said source means and to one of said two switch means outputs for gating said first source signal to said gate means output only when said switch means is in one of said two states,
   second gate means having an output and having two inputs respectively coupled to said opposite end of said source means and to the other of said two switch means outputs for gating said second source signal to said second gate means output only when said switch means is in the other of said two states, and signal averaging and indicating means having two inputs, one of which is coupled to said common reference point and the other of which is coupled to both of said gate means outputs, for indicating the average of the said gated first and second source signals and thereby the pulse frequency ratio of said pulse trains.

2. A computer as in claim 1 wherein said source means comprises two constant current sources having opposite polarities connected together to form said common reference point.

3. A ratio computer for determining the pulse frequency ratio of first and second trains of pulses, comprising:

electronic switch means having two mutually exclusive stable states, two outputs for respectively signalling the condition of said states, and two inputs for respectively receiving said pulse trains to effect said states by pulses respectively from said two trains, source means having an output for providing signals of constant frequency, first gate means having an output and having two inputs respectively coupled to said source means output and one of said switch means outputs for gating said constant frequency signals to said gate means output when said switch means is in one of said two states, second gate means having an output and having two inputs respectively coupled to said source means output and the other of said switch means outputs for gating said constant frequency signals to said second gate means output when said switch means is in the other of said two states, and a bidirectional digital counter having add and subtract inputs respectively coupled to said first and second gate means outputs for indicating in the form of a digital count the difference between the number of said constant frequency signals gated as aforesaid by said first and second gate means and thereby indicating the pulse frequency ratio of said pulse trains.

References Cited

UNITED STATES PATENTS

| | | | |
|---|---|---|---|
| 2,370,692 | 3/1945 | Shepherd | 324—89 X |
| 2,514,369 | 7/1950 | Buehler | 324—89 X |
| 2,557,900 | 6/1951 | Wallace et al. | 324—89 X |
| 2,663,863 | 12/1953 | Buehler | 324—69 X |
| 2,795,695 | 6/1957 | Raynsford | 328—133 |
| 2,924,757 | 2/1960 | Schaeve | 324—79 X |
| 2,963,648 | 12/1960 | Baskin et al. | 324—83 |
| 3,021,481 | 2/1962 | Kalmus et al. | 324—83 |
| 3,038,130 | 6/1962 | Gordon | 324—78 X |
| 3,058,063 | 10/1962 | Sher | 324—79 |
| 3,064,189 | 11/1962 | Erikson et al. | 324—79 |
| 3,069,623 | 12/1962 | Murgio | 324—79 X |
| 3,084,307 | 4/1963 | Landis | 324—79 X |
| 3,156,115 | 11/1964 | Adelmann. | |
| 3,187,195 | 6/1965 | Stefanov | 328—133 |
| 3,187,262 | 6/1965 | Crane | 328—133 |
| 3,225,199 | 12/1965 | Tolmie | 250—83 X |
| 3,234,447 | 2/1966 | Sauber. | |
| 3,257,612 | 6/1966 | Gorrill et al. | 324—69 |

OTHER REFERENCES

"Digital Phase Angle Meter Control," Moore, IBM Technical Disclosure Bulletin, vol. 3, No. 2, July 1960, p. 35.

RUDOLPH V. ROLINEC, *Primary Examiner.*

P. F. WILLE, *Assistant Examiner.*

U.S. Cl. X.R.

328—133; 324—82